United States Patent
Lomayev et al.

(10) Patent No.: US 10,505,765 B2
(45) Date of Patent: Dec. 10, 2019

(54) CHANNEL ESTIMATION FIELDS FOR WIRELESS NETWORKS

(71) Applicant: Intel IP Corporation, Santa Clara, CA (US)

(72) Inventors: Artyom Lomayev, Nizhny Novgorod (RU); Alexander Maltsev, Nizhny Novgorod (RU); Yaroslav P. Gagiev, Nizhny Novgorod (RU); Assaf Kasher, Haifa (IL); Michael Genossar, Modiin (IL); Vladimir Kravtsov, Jerusalem (IL); Carlos Cordeiro, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 32 days.

(21) Appl. No.: 15/280,630

(22) Filed: Sep. 29, 2016

(65) Prior Publication Data
US 2017/0317852 A1    Nov. 2, 2017

Related U.S. Application Data

(60) Provisional application No. 62/329,037, filed on Apr. 28, 2016.

(51) Int. Cl.
*H04L 25/02* (2006.01)
*H04B 7/0413* (2017.01)

(52) U.S. Cl.
CPC ...... *H04L 25/0258* (2013.01); *H04L 25/0204* (2013.01); *H04L 25/0226* (2013.01); *H04B 7/0413* (2013.01)

(58) Field of Classification Search
CPC .......... H04L 25/0202; H04L 25/0258; H04W 84/12; H04B 7/0413
See application file for complete search history.

(56) References Cited

U.S. PATENT DOCUMENTS

2007/0002963 A1   1/2007   Pedersen et al.
2010/0080266 A1*  4/2010   Zhang .................. H04J 13/102
                                                      375/140

(Continued)

FOREIGN PATENT DOCUMENTS

WO       2015198140       12/2015

OTHER PUBLICATIONS

International Search Report and Written Opinion for PCT Application No. PCT/US2017/024539, dated Jun. 26, 2017, 15 pages.

*Primary Examiner* — Jeffrey M Rutkowski
*Assistant Examiner* — Chae S Lee
(74) *Attorney, Agent, or Firm* — Eversheds Sutherland (US) LLP

(57) ABSTRACT

This disclosure describes methods, apparatus, and systems related to a channel estimation field (CEF) for various standards, for example, the 802.11ay standard, for single carrier (SC) MIMO channel estimation. In one embodiment, the CEF can use Golay complementary sequences. In another embodiment, the Golay complementary sequences can be defined similar to Golay complementary sequences definitions that can be found in various legacy standards, for example, the legacy 802.11ad standard. Various embodiments of the disclosure can allow channel estimation in the time domain and/or frequency domain, having small or negligible inter-stream interference. Various embodiments of the disclosure can enable an extendable structure for various M×N MIMO configurations, where M and N are positive integers.

19 Claims, 11 Drawing Sheets

(56) References Cited

U.S. PATENT DOCUMENTS

| | | |
|---|---|---|
| 2011/0209035 A1 | 8/2011 | Lakis |
| 2015/0280799 A1 | 10/2015 | Kwon et al. |
| 2015/0289147 A1* | 10/2015 | Lou ...................... H04B 7/0408 370/329 |
| 2016/0080175 A1 | 3/2016 | Huang |
| 2016/0164800 A1* | 6/2016 | Eitan ...................... H04L 47/80 370/389 |
| 2016/0308594 A1* | 10/2016 | Sanderovich ........ H04B 7/0613 |
| 2017/0111143 A1* | 4/2017 | Seok ..................... H04L 1/0091 |
| 2018/0262366 A1* | 9/2018 | Sahin .................. H04B 7/0452 |

\* cited by examiner

CHANNEL ESTIMATION FIELDS FOR WIRELESS NETWORKS

RELATED APPLICATIONS

This application claims the benefit of U.S. Provisional Application No. 62/329,037 filed Apr. 28, 2016, the disclosure of which is incorporated herein by reference as if set forth in full.

TECHNICAL FIELD

This disclosure generally relates to systems, devices and methods for wireless communications and, more particularly, systems, devices and methods directed to channel estimation for wireless communication, e.g., in Wireless Local Area Networks (WLANs), and/or Wi-Fi.

BACKGROUND

Various standards, for example, Institute of Electrical and Electronics Engineers (IEEE) 802.11ay, are being developed for the millimeter (mm) wave (for example, 60 GHz) frequency band of the spectrum. For example, IEEE 802.11ay is one such standard. IEEE 802.11ay is related to the IEEE 802.11ad standard, also known as WiGig. IEEE 802.11ay seeks, in part, to increase the transmission data rate between two or more devices in a network, for example, by implementing Multiple Input Multiple Output (MIMO) techniques.

DETAILED DESCRIPTION

Figure 1:
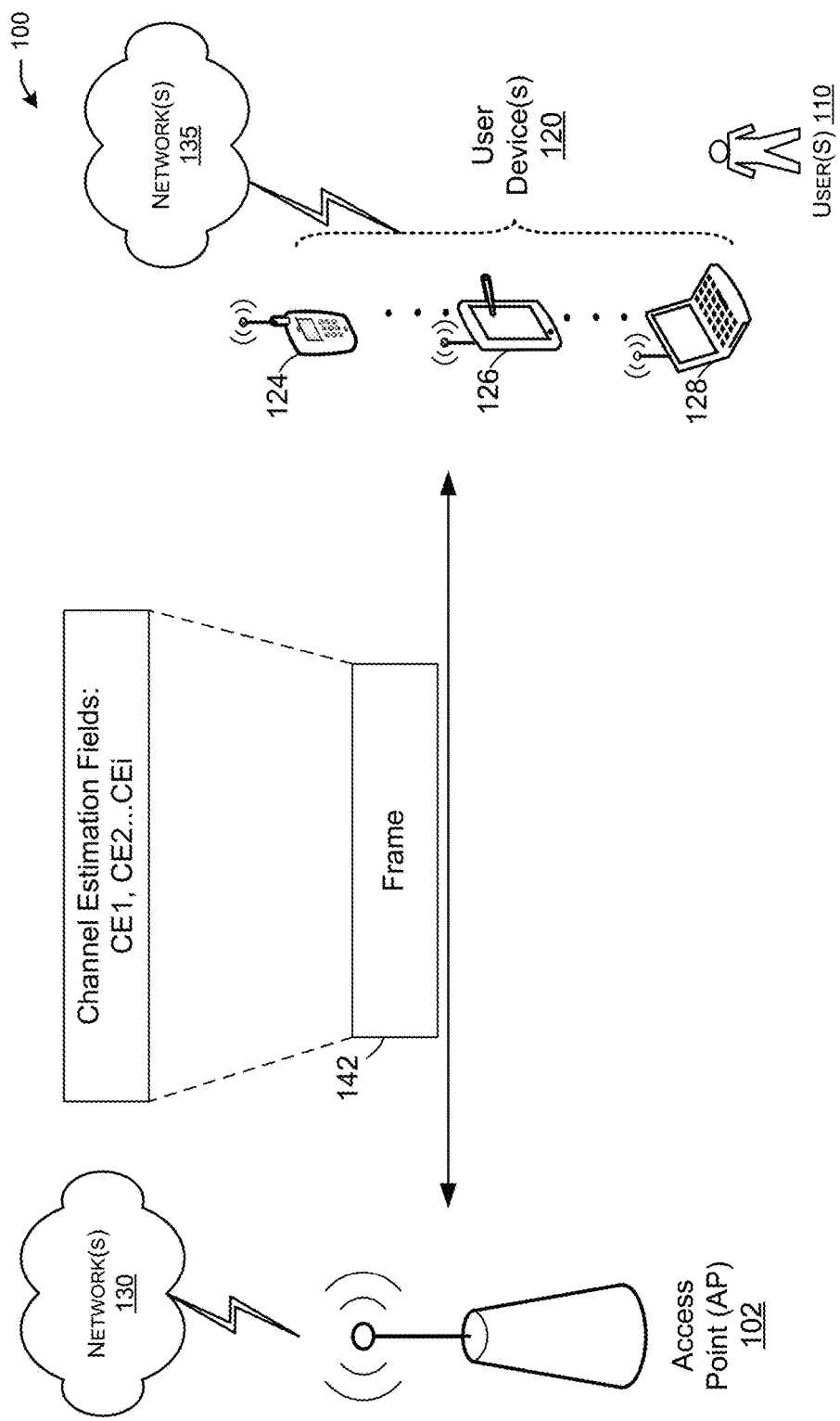
FIG. 1 shows an example network environment, in accordance with one or more example embodiments of the disclosure.

Example embodiments described herein provide certain systems, methods, and devices, for providing signaling information to Wi-Fi devices in various Wi-Fi networks, including, but not limited to, WiGig.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

In wireless networks, signals can be sent and received between transmitters and receivers through one or more channels. Such channels can induce distortions in the signal transmitted and received. To handle the distortions and maintain signal integrity, the characteristics of the one or more channels, at a given time, can be determined to estimate the induced distortion to the signals transmitted and received by the channels, that is, performing channel estimation.

One technique for performing channel estimation in wireless systems includes transmitting, by a transmitter, signals with predetermined sequences and comparing the signals received in a receiver. For example, auto-correlation and/or cross-correlation can be performed on the received with predetermined sequences to estimate the channel characteristics. Since the sequences of the transmitted signals are known to the receiver, the results of the correlation operation can yield the estimation of the channel characteristics, for example, the impulse response of the channel.

For efficient channel estimation, sequences with good autocorrelation properties, such as complementary sequences (for example, Golay complementary sequences), can be transmitted by the transmitter and auto-correlated by the receiver, for example, in one or more channel estimation fields (CEF) of data packets that contain the transmitted signal. One property of Golay complementary sequences is that they can have a sum of autocorrelations that equals the delta function.

Example embodiments of the present disclosure relate to systems, methods, and devices for a transmitting device that can include a Golay generator to generate Golay complementary sequences (Ga, Gb) which are can be modulated and transmitted, for example, using a modulator. The modulator may be, for example, an Orthogonal Frequency Division Multiplexing (OFDM) modulator, a single carrier (SC) modulator, and the like. In one embodiment, a Golay generator can generate the complementary sequences.

The signals including the Golay complementary sequences can be received at a receiving device. Because of the channel conditions, the received Golay sequences Ga', Gb' may be different from the original Golay sequences Ga, Gb. However, a Golay correlator can correlate the received sequences. The received signal S' (including sequences Ga',Gb') can be filtered using a filter. Then, the cross-correlation results can indicate the channel estimation as provided by the Golay correlator. Further, in various embodiments, an equalizer can equalizes the received signals S' based on the output of the Golay correlator. The equalized signals can be de-modulated using a demodulator to obtain an estimate of the originally transmitted signal.

In one embodiment, a wireless network used in connection with the systems and methods of this disclosure may also include one or more legacy devices. Legacy devices can include those devices compliant with an earlier version of a given standard, but those that reside in the same network as devices compliant with a later version of the standard. In one embodiment, disclosed herein are systems and methods that can permit legacy devices to communicate with and perform channel estimation with newer version devices.

Thus, newer devices or components using current standards can have backward compatibility with legacy devices within a network. These devices and components can be adaptable to legacy standards and current standards when transmitting information within the network. For example, backward compatibility with legacy devices may be enabled at either a physical (PHY) layer or a Media-Specific Access Control (MAC) layer. At the PHY layer, backward compatibility can be achieved, for example, by re-using the PHY preamble from a previous standard. Legacy devices may decode the preamble portion of the signals, which may provide sufficient information for determining the channel estimation or other relevant information for the transmission and reception of the signals. At the MAC layer, backward compatibility with legacy devices may be permitted or otherwise facilitated by having devices that are compliant with a newer version of the standard transmit additional frames using modes or data rates that are employed by legacy devices.

In various embodiments, the CEF can be used in the context of one or more standards, for example, an 802.11ay standard, for SC multiple-input and multiple-output (MIMO) channel estimation. In one embodiment, the CEF can use Golay complementary sequences, which can be denoted, for example, as Ga/Gb. In another embodiment, the Golay complementary sequences, for example, Ga/Gb can be defined similar to Golay complementary sequences definitions that can be found in various standards, for example, a legacy 802.11ad standard.

Various embodiments of the disclosure can allow channel estimation in the time domain and/or frequency domain, to achieve small or negligible inter-stream interference. Various embodiments of the disclosure can permit scalable systems and methods to implement channel estimation using CEFs for M×N MIMO configurations, where M and N represent positive integers. In one embodiment, the disclosure can be used in connection with channel bonding, for example, by using Golay complementary sequences Ga/Gb of a pre-determined length.

The CEF for MIMO transmission in various standards, for example, the 802.11ay standard, can, in various embodiments, reuse the legacy CEF structure based on the Golay sequences and update the legacy CEF structure to support MIMO channel estimation.

In various embodiments, the disclosed systems and methods for CEF construction can be generalized for high order MIMO applications.

FIG. 1 is a network diagram illustrating an example network environment, according to some example embodiments of the present disclosure. Wireless network 100 may include one or more devices 120 and one or more access point(s) (AP) 102, which may communicate in accordance with IEEE 802.11 communication standards, including IEEE 802.11ay. The device(s) 120 may be mobile devices that are non-stationary and do not have fixed locations.

The user device(s) 120 (e.g., 124, 126, or 128) may include any suitable processor-driven user device including, but not limited to, a desktop user device, a laptop user device, a server, a router, a switch, an access point, a smartphone, a tablet, wearable wireless device (e.g., bracelet, watch, glasses, ring, etc.) and so forth. In some embodiments, the user devices 120 and AP 102 may include one or more computer systems similar to that of the functional diagram of FIG. 8 and/or the example machine/system of FIG. 9, to be discussed further.

Returning to FIG. 1, any of the user device(s) 120 (e.g., user devices 124, 126, 128), and AP 102 may be configured to communicate with each other via one or more communications networks 130 and/or 135 wirelessly or wired. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), personal area networks (PANs), or the like. In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128), and AP 102 may include one or more communications antennas. The one or more communications antennas may be any suitable type of antennas corresponding to the communications protocols used by the user device(s) 120 (e.g., user devices 124, 126 and 128), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user device(s) 120 and/or AP 102.

Any of the user device(s) 120 (e.g., user devices 124, 126, 128), and AP 102 may be configured to perform directional transmission and/or directional reception in conjunction with wirelessly communicating in a wireless network. Any of the user device(s) 120 (e.g., user devices 124, 126, 128), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP 102 may be configured to perform any given directional transmission towards one or more defined transmit sectors. Any of the user device(s) 120 (e.g., user devices 124, 126, 128), and AP 102 may be configured to perform any given directional reception from one or more defined receive sectors.

In various embodiments, multiple-input and multiple-output (MIMO) beamforming in a wireless network may be accomplished using beamforming, including, for example, RF beamforming and/or digital beamforming. In some embodiments, in performing a given MIMO transmission, user device(s) 120 (e.g., user devices 124, 126, 128), and/or AP 102 may be configured to use all or a subset of its one or more communications antennas to perform MIMO beamforming.

Any of the user device(s) 120 (e.g., user devices 124, 126, 128), and AP 102 may include any suitable radio and/or transceiver for transmitting and/or receiving radio frequency (RF) signals in the bandwidth and/or channels corresponding to the communications protocols utilized by any of the user device(s) 120 (e.g., user devices 124, 126, 128), and AP 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

Typically, when an AP (e.g., AP 102) establishes communication with one or more user device(s) 120 (e.g., user devices 124, 126, and/or 128), the AP may communicate in the downlink direction by sending data frames (e.g., 142), which can include one or more CEFs. The channel estimation fields can include the Golay complementary sequences that can be used for performing channel estimation. The data frames may be preceded by one or more preambles that may be part of one or more headers. These preambles may be used to allow the user device to detect a new incoming data frame from the AP. A preamble may be a signal used in network communications to synchronize transmission timing between two or more devices (e.g., between the APs and user devices).

Channel state information (CSI) can refer to known channel properties of a communication link. This information describes how a signal propagates from the transmitter to the receiver and represents the combined effect of, for example, scattering, fading, and power decay with distance. The CSI can make it possible to adapt transmissions to current channel conditions. In various embodiments, CSI information can be used for achieving communication with high data rates, for example, in multi-antenna systems. In one embodiment, a channel field (CEF) can be used for multiple-input and multiple-output (MIMO) channel estimation. In one embodiment, the CEF fields may use Orthogonal Frequency-Division Multiple Access (OFDMA) modulation.

In various embodiments, the CEF can be used in the context of one or more standards, for example, an 802.11ay standard, for SC MIMO channel estimation. In one embodiment, the CEF can use Golay complementary sequences, which can be denoted, for example, as Ga/Gb. In another embodiment, the Golay complementary sequences, for example, Ga/Gb can be defined similar to Golay complementary sequences definitions that can be found in various standards, for example, a legacy 802.11ad standard.

Various embodiments of the disclosure can allow channel estimation in the time domain and/or frequency domain, to achieve small or negligible inter-stream interference. Various embodiments of the disclosure can enable scalable systems and methods to implement channel estimation using CEFs for M×N MIMO configurations, where M and N are positive integers. In one embodiment, the disclosure can be used in connection with channel bonding, for example, by using Golay complementary sequences Ga/Gb of a predetermined length.

Various standards, for example, IEEE 802.11ad, define CEFs for Single Input Single Output (SISO) system based on the complementary Golay sequences, as can be denoted by Ga and Gb. In one embodiment, the CEF can have a length of approximately 128 samples, which may be defined at the SC chip rate of approximately 1.76 GHz.

In one embodiment, the CEF can have the property that the sum of autocorrelation functions for the complementary Golay sequences, Ga and Gb, can be equal to the delta function. This can be represented mathematically as:

$$Ga^*(-n) \otimes Ga(n) + Gb^*(-n) \otimes Gb(n) = \delta(n) \quad (1)$$

Where the symbol $\otimes$ denotes circular convolution, * denotes complex conjugation, and the $-n$ index can define the inverse order of samples in the Ga/Gb sequence. Assuming that the sum of autocorrelation functions for Ga and Gb can be equal to the delta function, the channel impulse response $h(n)$ estimation can be defined as:

$$Ga^*(-n) \otimes h(n) \otimes Ga(n) + Gb^*(-n) \otimes h(n) \otimes Gb(n) = h(n) \otimes \delta(n) = h(n) \quad (2)$$

Various standards, for example, the IEEE 802.11ad standard, can include a $Ga_{128}$ and $Gb_{128}$ sequences taken with different polarity.

Figure 2:
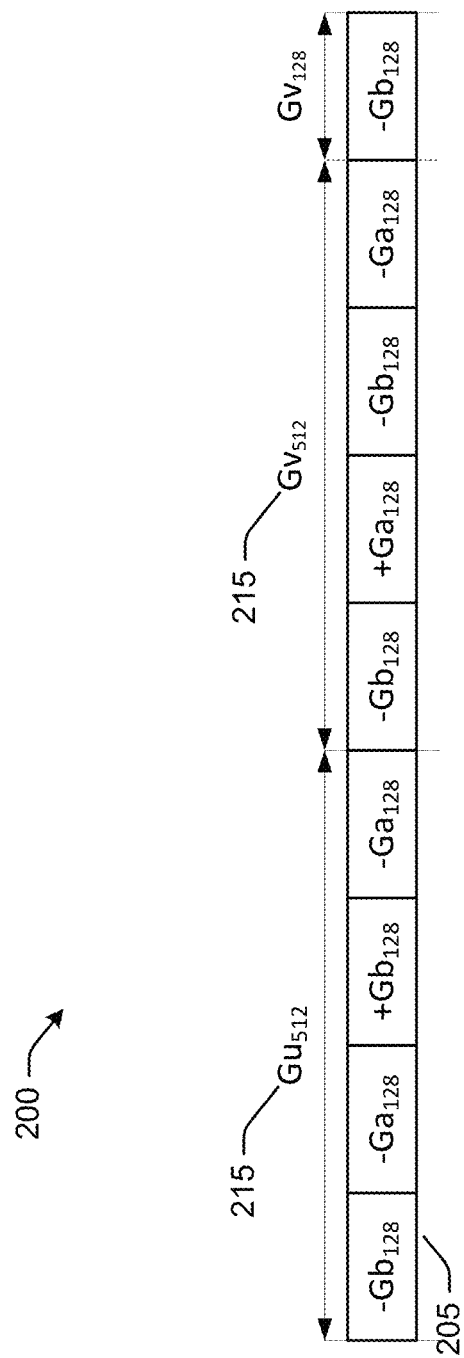
FIG. 2 shows a diagram of an example channel estimation filed (CEF) that can be used with one or more standards, for example, with the IEEE 802.11ad standard for Single Input Single Output (SISO) systems, in accordance with example embodiments of the disclosure.

FIG. 2 shows a diagram 200 of a legacy CEF as defined in the IEEE 802.11ad standard for SISO systems, in accordance with example embodiments of the disclosure. In one embodiment, the first $-Gb_{128}$ field 205 in FIG. 2 can represent a Guard Interval (GI) to guarantee the circular convolution property of the CEF. In another embodiment, the 4 $Ga_{128}/Gb_{128}$ field sequences 215 in FIG. 2 following each other in time and can be combined into $Gu_{512}$ and $Gv_{512}$ field sequences of size 512 samples. In various embodiments, the signs of the sequences can be determined so that the $Gu_{512}$ and $Gv_{512}$ field sequences can also be complementary sequences. In one embodiment, the sequences can be appended with a $-Gb_{128}$ field repetition at the end of the CEF.

In various embodiments, the $Ga_{128}$ and $Gb_{128}$ sequences taken with different polarity can allow for channel estimation in the time domain (for example, as defined in equations 1-2, above). In another embodiment, channel estimation in the frequency domain can be obtained by (i) taking the Discrete Fourier Transform (DFT) of the Gv and Gu field sequences, (ii) generating a matched filter and (iii) summing the two, as will be shown below.

Denoting the Fourier transform of Gu and Gv sequences as:

$$U = \text{DFT}(Gu)$$

$$V = \text{DFT}(Gv) \qquad (3)$$

The channel estimation can be found as:

$$U \cdot U^* + V \cdot V^* = 1$$

$$H \cdot U \cdot U^* + H \cdot V \cdot V^* = H \qquad (4)$$

Where U* and V* can represent matched filter solutions to the Fourier transform of Gu and Gv in the frequency domain, and where multiplication is done in an element-by-element fashion. Furthermore, the index inside each of the vectors H, U, and V can define the subcarrier index.

The CEF for MIMO transmission in various standards, for example, the 802.11ay standard, can, in various embodiments, (1) reuse the legacy CEF structure based on the Golay sequences and update the legacy CEF structure to support MIMO channel estimation; (2) allow channel estimation in both time and frequency domain; and (3) allow efficient phase noise impact compensation and phase tracking, as is described further below.

In one embodiment, the design of the CEF for a 2×N MIMO configuration can be based at least in part on a zero cross correlation property of the Golay sequences comprising the CEF, as defined below. It can be shown that 2 complementary pairs of Golay sequences of length M, for example, ($Ga^1_M$, $Gb^1_M$) and ($Ga^2_M$, $Gb^2_M$), can have zero cross correlation if they are related as follows:

$$Ga_M^2(n) = Ga_M^1(n),\ n=0,2,4,\ldots\ Ga_M^2(n) = -Ga_M^1(n),\ n=1,3,5,\ldots$$

$$Gb_M^2(n) = Gb_M^1(n),\ n=0,2,4,\ldots\ Gb_M^2(n) = -Gb_M^1(n),\ n=1,3,5,\ldots \qquad (5)$$

Hence, the Golay sequences have identical elements for even values of the index n and elements with inverse polarity for the odd values of index n. In one embodiment, the zero cross correlation property for the Golay sequences defined in equation 5 can allow for a zero cross correlation between the sequences as follows:

$$Ga_M^2(-n) \otimes Ga_M^1(n) + Gb_M^2(-n) \otimes Gb_M^1(n) = 0$$

$$Ga_M^1(-n) \otimes Ga_M^2(n) + Gb_M^1(-n) \otimes Gb_M^2(n) = 0 \qquad (6)$$

Figure 3:
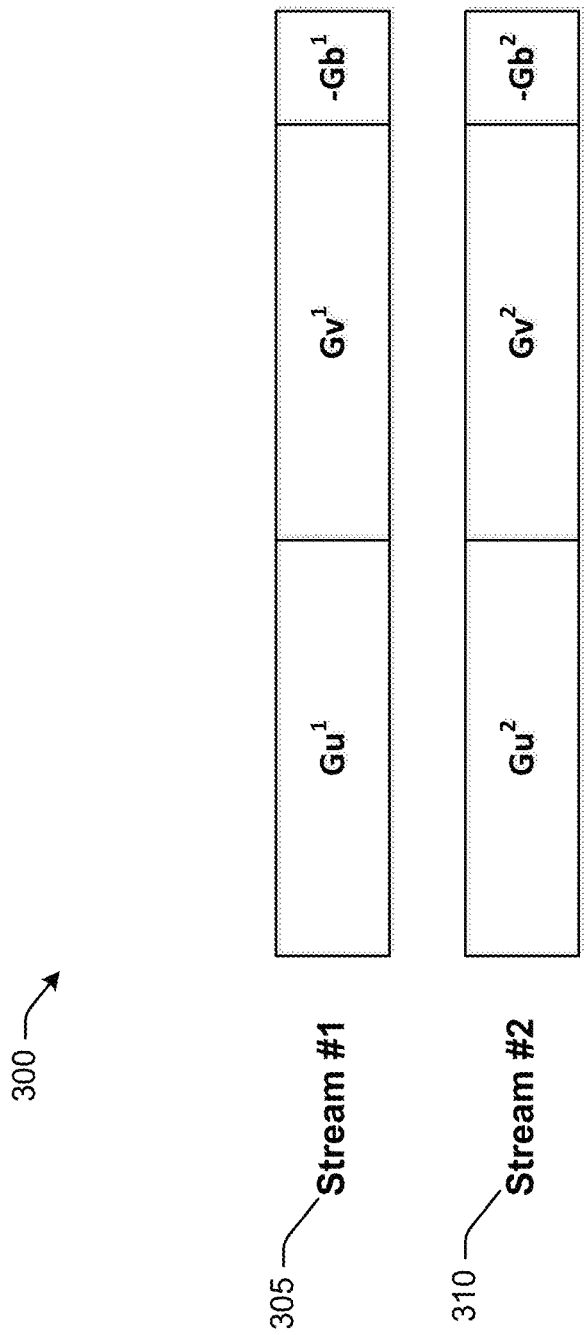
FIG. 3 shows a diagram of an example CEF for a 2×N single carrier (SC) multiple-input and multiple-output (MIMO) configuration, in accordance with example embodiments of the disclosure.

FIG. 3 shows a diagram 300 the disclosed CEF design for 2×N MIMO, in accordance with example embodiments of the disclosure.

Note that $Gu^1$ and $Gv^1$ can be composed of $Ga^1_M/Gb^1_M$ Golay sequences and $Gu^2$ and $Gv^2$ can be composed of $Ga^2_M/Gb^2_M$ Golay sequences as described in equation 5. In one embodiment, the CEFs for spatial stream #1 305 and spatial stream #2 310 of FIG. 3 can have the same structure as the legacy CEF 200 shown in FIG. 2.

In various embodiments, channel estimation can be performed in the time domain and/or the frequency domain. For the purpose of algorithm explanation, the channel estimation can be considered in the frequency domain. In one embodiment, $U^i$ and $V^i$ can be defined as vectors that can represent the DFT of the Golay sequences $Gu^i$ and $Gv^i$ in the time domain as:

$$U^i = \text{DFT}(Gu^i), V^i = \text{DFT}(Gv^i) \qquad (7)$$

Furthermore, the receive vectors Yu and Yv at the first receiving antenna in frequency domain can then be defined as:

$$Yu = +H_{11}U^1 + H_{12}U^2 + Zu$$

$$Yv = +H_{11}V^1 + H_{12}V^2 + Zv \qquad (8)$$

Where $H_{11}$ and $H_{12}$ are target channel coefficients to be estimated, and $Z_u$ and $Z_v$ are additive noise vectors. Note that similar equations can be written for any receiving antenna in a similar way. For clarity the equations are provided for the receiving device antenna with index 1 herein. In one embodiment, channel estimation for all antennas can be performed in parallel.

In various embodiments, channel estimation for the $H_{11}$ coefficient can be determined by an application of a matched filter solution to vectors $U^1$ and $V^1$ as follows:

$$\hat{H}_{11} = YuU^{1*} + YvV^{1*} = \qquad (9)$$

$$H_{11}\underbrace{(U^1U^{1*} + V^1V^{1*})}_{=1} + H_{12}\underbrace{(U^2U^{1*} + V^2V^{1*})}_{=0} + Z_uU^{1*} + Z_2V_1^*$$

Note that the inter-stream interference term $U^2U^{1*} + V^2V^{1*}$ in equation 9 is cancelled out (equal to 0) due to the zero cross correlation property of the sequences. Similarly, the channel estimation for $H_{12}$ coefficient can be found as follows:

$$\hat{H}_{12} = YuU^{2*} + YvV^{2*} = \qquad (10)$$

$$H_{12}\underbrace{(U^2U^{2*} + V^2V^{2*})}_{=1} + H_{11}\underbrace{(U^1U^{2*} + V^1V^{2*})}_{=0} + Z_uU^{2*} +$$

In one embodiment, here, matched filters can be determined for vectors $U^2$ and $V^2$.

In various embodiments, the disclosed systems and methods for CEF construction can be generalized for high order MIMO applications. For example, for a 4×N MIMO, the original complementary Golay pairs ($Ga^1_M$, $Gb^1_M$) and ($Ga^2_M$, $Gb^2_M$) can be supplemented with the two additional pairs ($Ga^3_M$, $Gb^3_M$) and ($Ga^4_M$, $Gb^4_M$).

Note that ($Ga^3_M$, $Gb^3_M$) and ($Ga^4_M$, $Gb^4_M$) can have a zero cross correlation property similar to the pairs ($Ga^1_M$, $Gb^1_M$) and ($Ga^2_M$, $Gb^2_M$). Furthermore, sequences ($Ga^1_M$, $Gb^1_M$) and ($Ga^3_M$, $Gb^3_M$), ($Ga^1_M$, $Gb^1_M$) and ($Ga^4_M$, $Gb^4_M$), ($Ga^2_M$, $Gb^2_M$) and ($Ga^3_M$, $Gb^3_M$), and ($Ga^2_M$, $Gb^2_M$) and ($Ga^4_M$, $Gb^4_M$) may not be zero cross correlated. The Golay sequences used in the design for the 4×N MIMO case can be orthogonal to each other.

Figure 4:
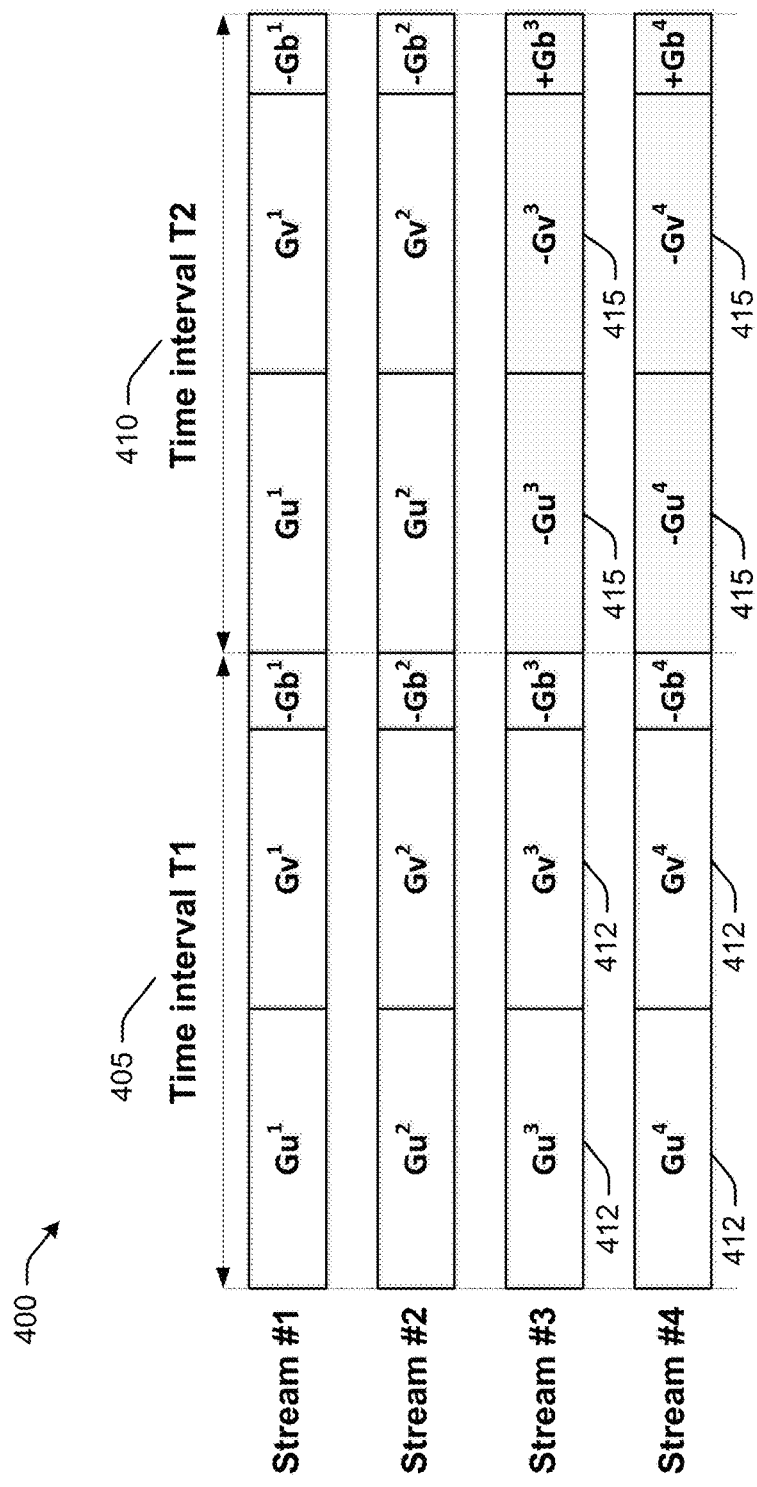
FIG. 4 shows a diagram of an example CEF for a 4 spatial stream transmit MIMO configuration, in accordance with example embodiments of the disclosure.

FIG. 4 shows a diagram 400 showing the generalization of the CEF field for 4 spatial streams, in accordance with example embodiments of the disclosure. In one embodiment, during a second time interval 410, the CEFs 415 for stream #3 and stream #4 can be sign inverted with respect to the CEFs 412 for stream #3 and stream #4 for a first time interval 405.

In one embodiment, the channel estimation for the first receiving antenna in the frequency domain can be similar to the 2×N MIMO case, described above. The received vectors in the frequency domain during time intervals $T_1$ 405 and $T_2$ 410 can be defined as follows:

$$Yu_{T1} = H_{11}U^1 + H_{12}U^2 + Zu_{T1}\ Yu_{T2} = H_{11}U^1 + H_{12}U^2 + Zu_{T2}$$

$$Yv_{T1} = H_{11}V^1 + H_{12}V^2 + Zv_{T1}\ Yv_{T2} = H_{11}V^1 + H_{12}V^2 + Zv_{T2} \qquad (11)$$

In one embodiment, the channel estimation for the $H_{11}$ coefficient can be determined as:

$$\hat{H}_{11} = \frac{1}{2}((Yu_{T1}U^{1^*} + Yv_{T1}V^{1^*}) + (Yu_{T2}U^{1^*} + Yv_{T2}V^{1^*})) \quad (12)$$

In another embodiment, the summation with the signal from the second time interval 410 can cancel out the inter-stream interference from antennas #3 and #4.

In one embodiment, the channel estimation for the $H_{12}$ coefficient can be determined as:

$$\hat{H}_{12} = \frac{1}{2}((Yu_{T1}U^{2^*} + Yv_{T1}V^{2^*}) + (Yu_{T2}U^{2^*} + Yv_{T2}V^{2^*})) \quad (13)$$

In another embodiment, the channel estimation for $H_{13}$ coefficient can be determined as:

$$\hat{H}_{13} = \frac{1}{2}((Yu_{T1}U^{3^*} + Yv_{T1}V^{3^*}) - (Yu_{T2}U^{3^*} + Yv_{T2}V^{3^*})) \quad (14)$$

In one embodiment, the channel estimation for $H_{14}$ coefficient can be determined as:

$$\hat{H}_{14} = \frac{1}{2}((Yu_{T1}U^{4^*} + Yv_{T1}V^{4^*}) - (Yu_{T2}U^{4^*} + Yv_{T2}V^{4^*})) \quad (15)$$

In various embodiments, similar channel estimations can be applied for other receiving antennas. In one embodiment, the estimations for all receiving antennas can be performed in parallel.

Figure 5:
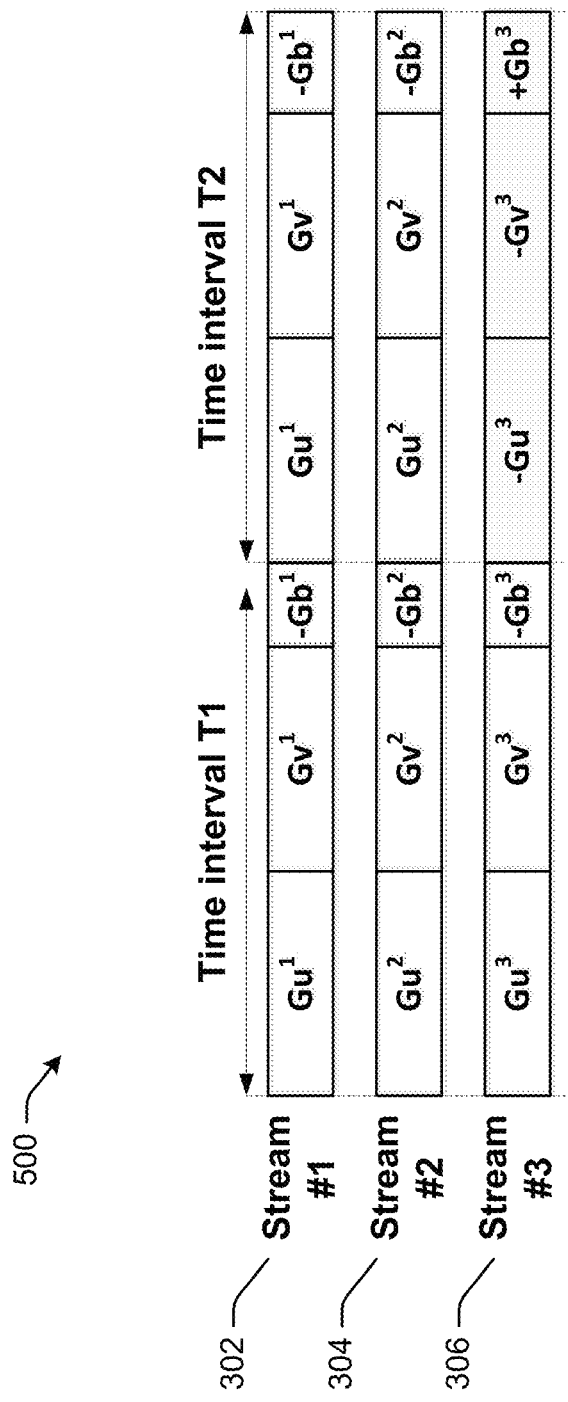
FIG. 5 shows a diagram of an example CEF for 3 spatial stream MIMO configuration, in accordance with one or more example embodiments of the disclosure.

FIG. 5 shows a diagram 500 of an example generalization of the CEF field for 3 streams 302, 304, and 306. In one embodiment, the CEF for 3 streams 302, 304, and 306 can be obtained by simply discarding the signal for the 4th stream.

In one embodiment, channel estimation for $H_{11}$, $H_{12}$, and $H_{13}$ can be determined in accordance with the same equations as for the 4×N MIMO case considered above in connection with FIG. 4.

Figure 6A:
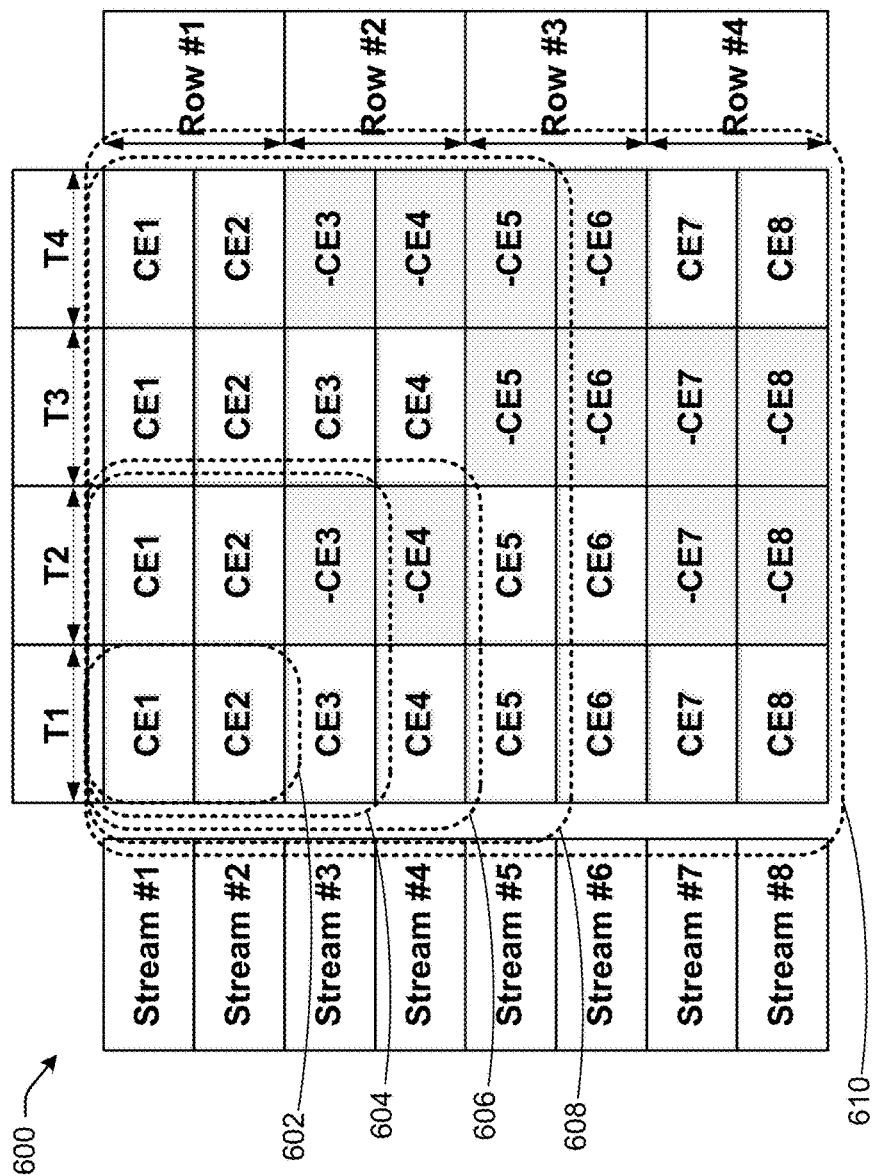
FIG. 6A shows a diagram of an example CEF for 8 transmit spatial stream transmit MIMO configuration, in accordance with one or more example embodiments of the disclosure

FIG. 6A shows a diagram 600 representing the design for 8 spatial streams in accordance with example embodiments of the disclosure.

Figure 6B:
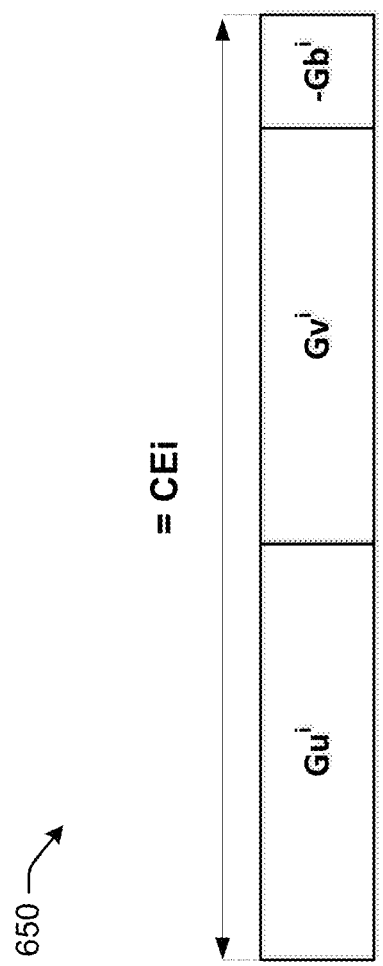
FIG. 6B shows a diagram of an example CEF for the i-th element in FIG. 6A, where i is an integer between 1 and 8, in accordance with one or more example embodiments of the disclosure.

In one embodiment, the systems and methods for CEF generation can be further generalized to an arbitrary MIMO configuration. Further, FIG. 6B shows a diagram 650 of example CEF for the i-th element in FIG. 6A, where each field in the presented CEF (CEi, where i is an integer between 1 and 8) can be defined in a similar way as in the 2×N, 3×N, 4×N MIMO configurations presented above.

Note that adjacent streams in FIG. 6A, for example, groups of streams, for example, a group including stream 1, another group including streams 2 and 3, another group including streams 4 and 5 and another group including streams 6, 7 and 8 can be separated using the zero cross correlation property; consequently they can have an identical sign inversion law.

In one embodiment, the signs of the CEF sequences can be defined by an orthogonal matrix P. For example, it can be a Hadamard matrix P where P can be defined as:

$$P = \begin{matrix} & T1 & T2 & T3 & T4 \\ \text{row \#1:} & [1 & 1 & 1 & 1 \\ \text{row \#2:} & 1 & -1 & 1 & -1 \\ \text{row \#3:} & 1 & 1 & -1 & -1 \\ \text{row \#4:} & 1 & -1 & -1 & 1] \end{matrix}$$

Each row in the matrix P can refer to the signs for the adjacent streams, as shown in the diagram 600 of FIG. 6A. In one embodiment, each column of the matrix P can define the sign for the corresponding time interval Ti, where index i is an integer between 1 and 4, inclusive. Note that any orthogonal matrix can be used to define the signs for adjacent streams and is not limited to the particular matrix P presented above.

In one embodiment, the duration of the CEF can be based at least in part on the number of spatial streams. For example, as shown by group 602, for 2 spatial streams (e.g., Stream 1 and Stream 2), the time duration can be T=T1; starting from 3 spatial streams (as shown by group 604) and up to 4 spatial streams (as shown by group 606), the time duration can be T=T1+T2; starting from 5 spatial streams (as shown by group 608) and up to 8 spatial streams (as shown by group 610), the time duration can be T=T1+T2+T3+T4. As an example, group 604 may include Streams 1, 2, and 3 and may have a time duration of T1+T2.

Various standards, for example, the IEEE 802.11ay standard, may limit the maximum number of spatial streams to 8 spatial streams for single user (SU) MIMO transmission. However the disclosed systems and methods can be used to support transmission of any number of spatial streams. In various embodiments, a processing gain that may be needed for channel estimation may be insufficient as the number of spatial streams is increased; therefore, the duration of each CEF sub-filed may be increased by a predetermined amount.

In the various examples mentioned in this disclosure, the length of the complementary Golay sequences $Ga_M$ and $Gb_M$ can be equal to M=128 samples. However it is understood that Golay sequence of any size can be used. For example, Golay sequences can have a size of 256, 384 and 512 samples for channel bonding of ×2, ×3, and ×4, accordingly. In one embodiment, the sequences $Ga_M/Gb_M$ can be orthogonal in time.

In one embodiment, the set of orthogonal Golay sequences can be generated using an approach based on Hadamard matrix. The generation procedure includes 2 square matrices $G_N$ and $H_N$, both having a size of N. Both matrices can be reconstructed recursively as follows:

$$H_N = \begin{bmatrix} H_{N/2} & G_{N/2} \\ H_{N/2} & -G_{N/2} \end{bmatrix} \quad G_N = \begin{bmatrix} H_{N/2} & -G_{N/2} \\ H_{N/2} & G_{N/2} \end{bmatrix} \quad (16)$$

In one embodiment, the size of these matrices can double every iteration starting with initial matrices of size 1×1 chosen to be $G_1=H_1=+1$. A set of complementary Golay sequences of length N can be generated by applying this procedure. The set of complementary Golay sequences of length N can be derived from the $H_N$ matrix in accordance with embodiments disclosed herein. In one embodiment, the first $H_N$ can be divided into an upper and a lower half matrices of size N/2 by N as follows:

$$H_{upper}=[H_{N/2}G_{N/2}] \; H_{lower}=[H_{N/2}-G_{N/2}] \quad (17)$$

In another embodiment, the i-th row in the matrix $H_{upper}$ and $H_{lower}$ can define a corresponding complementary pair of Golay sequences ($Ga^i_N$, $Gb^i_N$). All rows can be mutually orthogonal to one another. In one embodiment, the zero cross correlation property can hold for only two Golay sequences $Ga^i_N/Gb^i_N$ and $Ga^j_N/Gb^j_N$ with indexes i and j in the set.

In one embodiment, the correlating of the complementary Golay sequences and/or one or more transmitted or received signals may be related to or based at least in part on a network's link quality, such as a quality of service associated with a device (for example, a latency, a bandwidth or throughput associated with the device in the network and/or an availability or uptime, a data error rate, jitter, and the like; a level of interference; load, such as a number of users currently connected to the wireless device, a type of traffic being transmitted via the wireless device (for example, bursty traffic, continuous traffic, etc.); load balancing; end-to-end connectivity, such as to which other devices the devices in the network are connected; and/or backhaul connectivity. In another embodiment, the correlating of the complementary Golay sequences and/or one or more transmitted or received signals may be determined by either a transmitting device or receiving device periodically, according to a schedule.

Figure 7A:
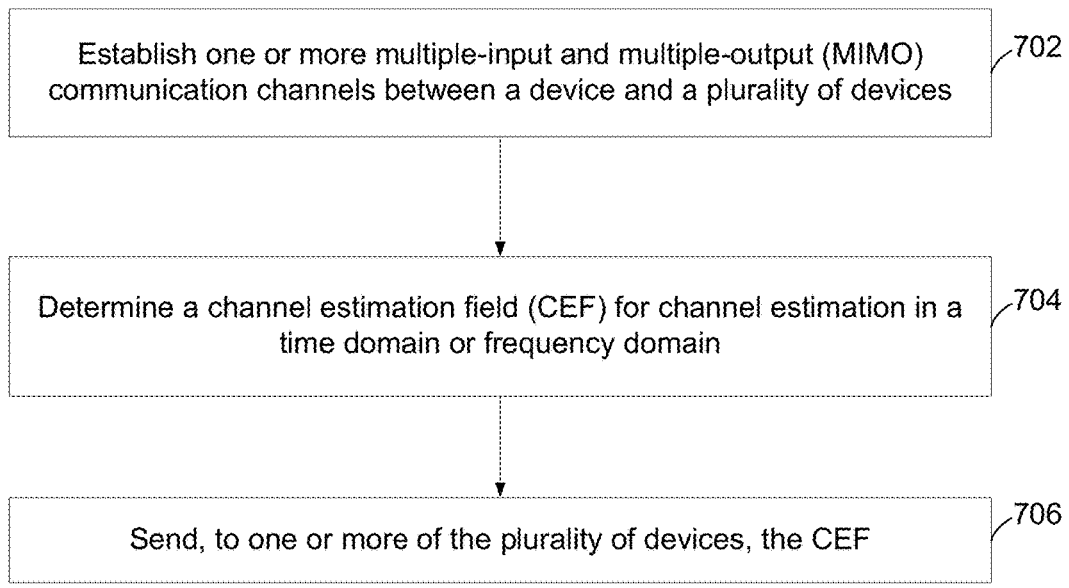
FIGS. 7A-7B show diagrams of example flow charts illustrating various processes for the use of the CEFs in wireless networks, in accordance with one or more example embodiments of the disclosure.

FIG. 7A show diagrams of an example flow chart in accordance with one or more example embodiments of the disclosure. In one embodiment, the flow chart can be used in connection with a transmitting device (for example, an Access Point, AP) on a wireless network.

In block 702, a device (e.g., the user device(s) 120 and/or the AP 102 of FIG. 1) may establish or determine to establish one or more multiple-input and multiple-output (MIMO) communication channels between a device and a plurality of devices. The establishment of the MIMO communications channels may first involve a determination of data by the device to send to one or more devices of the plurality of devices. This determination of the data to send may be made, for example, based on a user input to the device, a predetermined schedule of data transmissions on the network, changes in network conditions, and the like. The establishment of the MIMO communications channels may further involve the transmission of one or more data packets (for example, one or more Request to Send (RTS)) to notify the one or more devices of the plurality of devices to establish the communications channel. In one embodiment, the establishment of the MIMO communications channels may be performed in accordance with one or more wireless and/or network standards.

In block 704, the device may determine channel estimation fields (CEFs) for channel estimation in a time domain or frequency domain. In various embodiments, the generation of the CEFs can be based in part on the determination of one or more Golay complementary sequences, which can be denoted, for example, as Ga/Gb, as discussed in connection with equations 1-17. In one embodiment, the CEFs can be used in the context of one or more standards, for example, an 802.11ay standard, for SC MIMO channel estimation. In one embodiment, the CEFs can use Golay complementary sequences. In another embodiment, the Golay complementary sequences, for example, Ga/Gb can be defined similar to Golay complementary sequences definitions that can be found in various standards, for example, a legacy 802.11ad standard. Various embodiments the CEFs can be used for channel estimation of M×N MIMO configurations, where M and N are positive integers. In one embodiment, the CEFs can have a length of approximately 128 samples, which may be defined at the SC chip rate of approximately 1.76 GHz.

In block 706, the device may send CEFs to one or more of the plurality of devices. In one embodiment, the one or more CEFs may be encapsulated in a data frame that is sent from the device to one or more of the plurality of devices. In another embodiment, CEFs may be sent in a header of the data frame. In one embodiment, the CEFs may be sent at a predetermined time based at least in part on a predetermined schedule of communication between the devices of the network. In another embodiment, first CEFs may be first sent by the device, a period of time may elapse, and the device may repeat some or all of the procedures described in connection with block 704, and resend second CEFs. In one embodiment during, or after the transmission of the CEFs, the device may receive information from the receiving device, indicative of a change to be performed by the transmitting device in sending data. For example, the information may indicate to change the number of streams of the MIMO communications channels, to increase and/or decrease the amount of data transmitted on one or more channels of the MIMO communications channels, to retransmit one or more packets of data, to send one or more packets of data at a predetermined time, and the like.

Figure 7B:
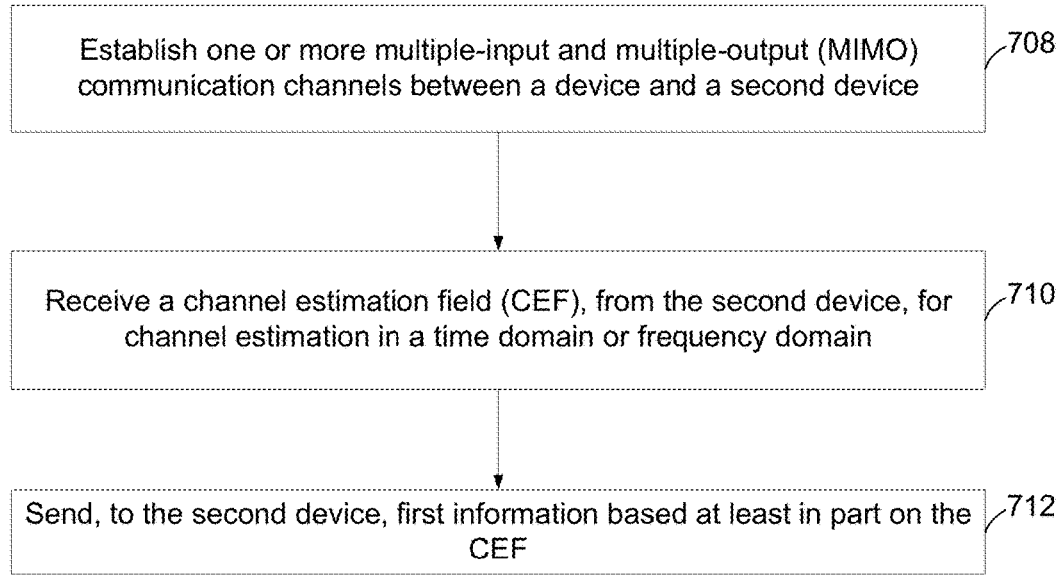

FIG. 7B show diagrams of an example flow chart in accordance with one or more example embodiments of the disclosure. In one embodiment, the flow chart can be used in connection with a receiving device (for example, a wireless Source (SRC) station (STA)) on a wireless network.

In block 708, a device (e.g., the user device(s) 120 and/or the AP 102 of FIG. 1) may establish one or more MIMO communication channels between the device and a second device. The establishment of the MIMO communications channels may first involve a determination of data by the device to send to the second device. This determination of the data to send may be made, for example, based on a user input to the device or the second device, a predetermined schedule of data transmissions on the network, changes in network conditions, and the like. The establishment of the MIMO communications channels may further involve the transmission of one or more data packets (for example, one or more Clear to Send (CTS)) to notify the second device of one or more conditions related to the establishment of the communications channels. The establishment of the MIMO communications channels may be performed in accordance with one or more wireless and/or network standards.

In block 710, the device can receive CEFs, from the second device, for channel estimation in a time domain or frequency domain. In one embodiment, the CEFs may be encapsulated in a data frame. In another embodiment, CEFs may be sent in a header of the data frame. In one embodiment, the CEFs may be sent at a predetermined time based at least in part on a predetermined schedule of communication between the devices of the network. In another embodiment, first CEFs may be first received by the device, a period of time may elapse, and second CEFs may be received by the device. The second CEFs can thereby reflect changes in the condition of the channel(s) or device(s) over time.

In block 712, the device can send first information to the second device based at least in part on the CEFs. In one embodiment during, or after the reception of the first or second CEFs, the device may determine the first information, the information indicative of a change to be performed by the transmitting device in sending data. For example, the first information may indicate to the second device to change the number of streams of the MIMO communications channels, to increase and/or decrease the amount of data transmitted on one or more channels of the MIMO communications channels, to retransmit one or more packets of data, to send one or more packets of data at a predetermined time, and the like.

Figure 8:
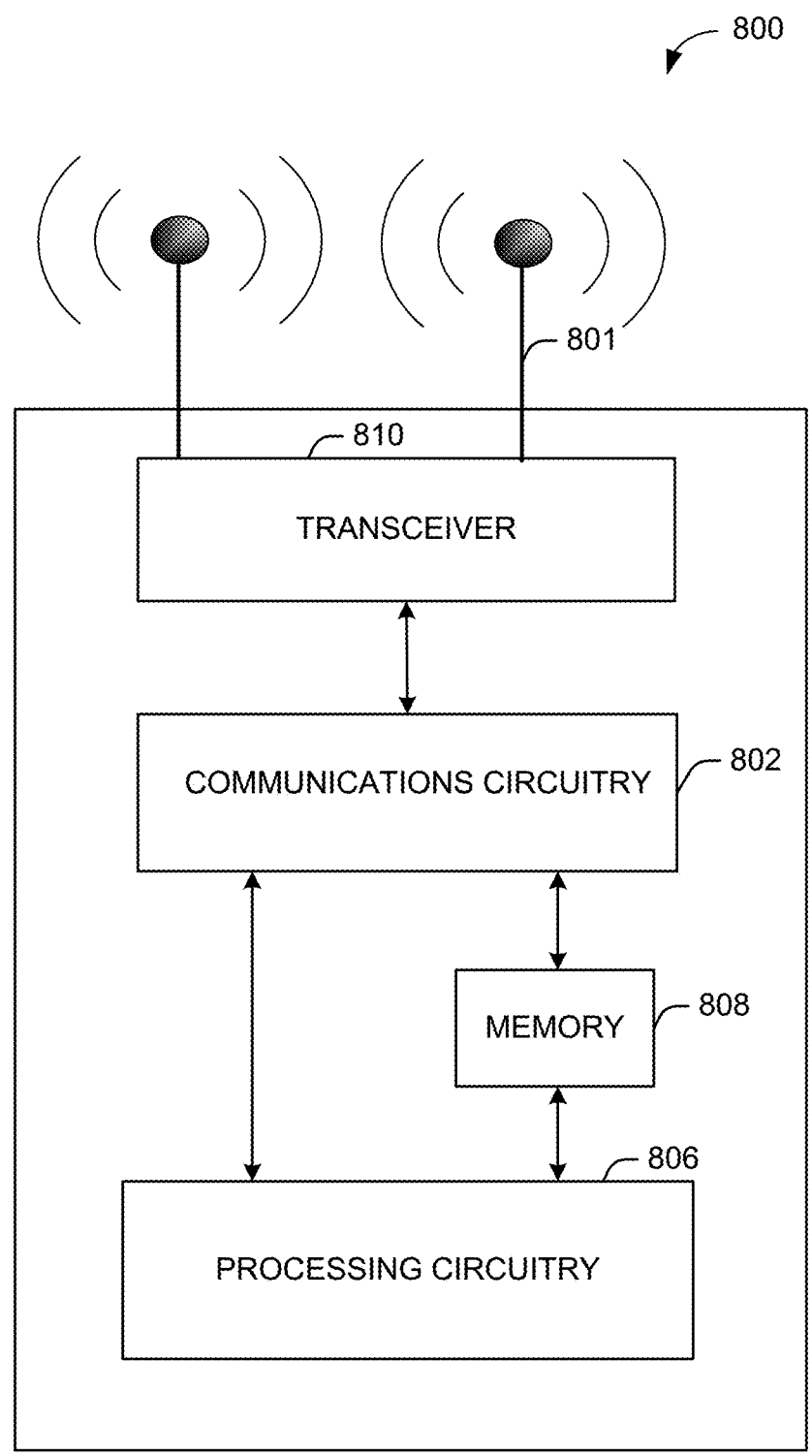
FIG. 8 illustrates a functional diagram of an example communication station that may be suitable for use as a user device, in accordance with one or more example embodiments of the disclosure.

FIG. 8 shows a functional diagram 800 of an example communication station 800 in accordance with some embodiments. In one embodiment, FIG. 8 illustrates a functional block diagram of a communication station that may be suitable for use as an AP 102 (FIG. 1) or communication station user device 120 (FIG. 1) in accordance with some embodiments. The communication station 800 may also be suitable for use as a handheld device, mobile device, cellular telephone, smartphone, tablet, netbook, wireless terminal, laptop computer, wearable computer device, femtocell, High Data Rate (HDR) subscriber station, access point, access terminal, or other personal communication system (PCS) device.

The communication station 800 may include communications circuitry 802 and a transceiver 810 for transmitting and receiving signals to and from other communication stations using one or more antennas 801. The communications circuitry 802 may include circuitry that can operate the physical layer communications and/or medium access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in FIGS. 1-7.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

Figure 9:
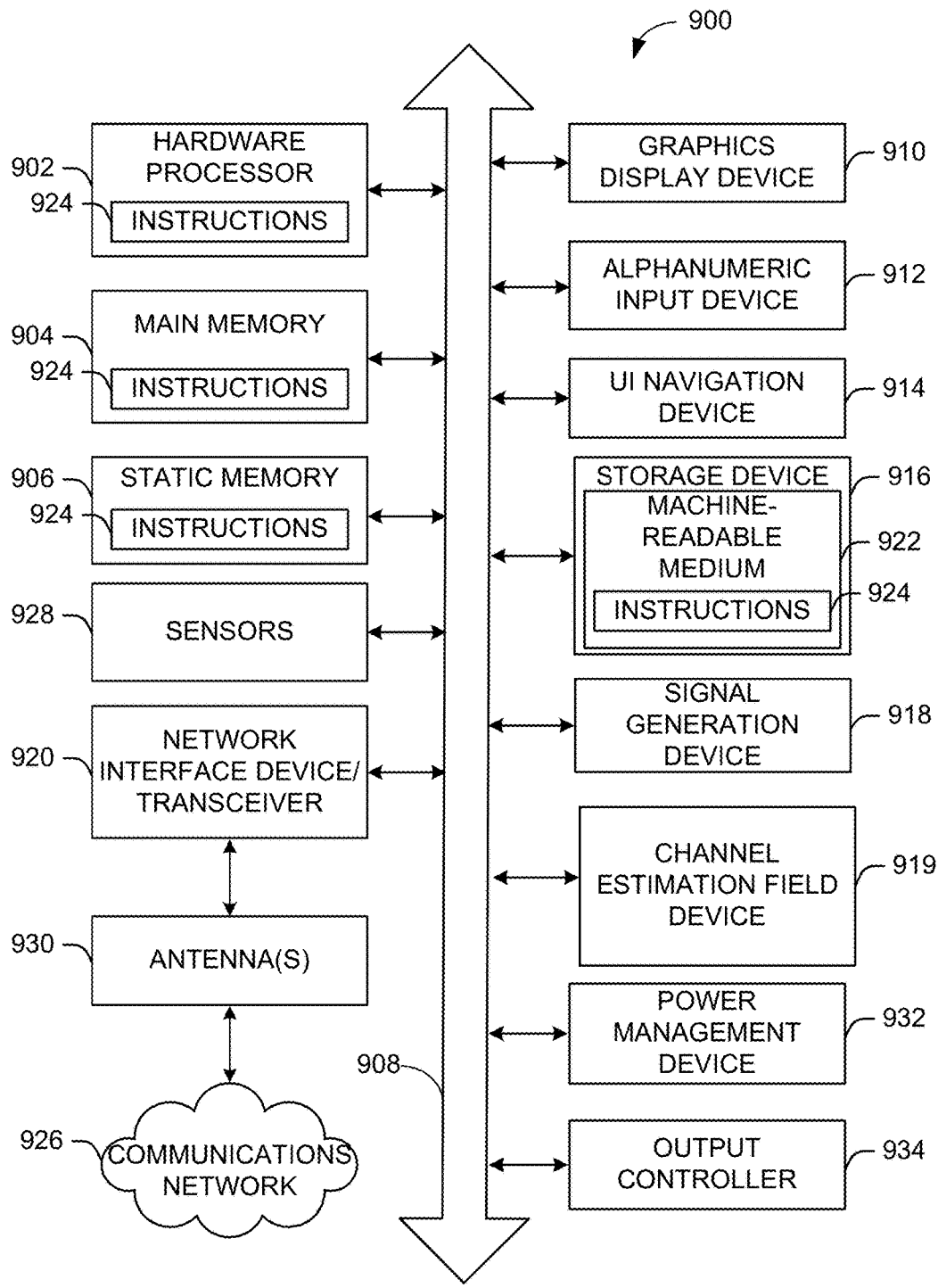
FIG. 9 shows a block diagram of an example machine upon which any of one or more techniques (e.g., methods) may be performed, in accordance with one or more embodiments of the disclosure.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, wearable computer device, a web appliance, a network router, switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), a channel estimation field (CEF) device 919, a network interface device/transceiver 920 coupled to antenna(s) 930, and one or more sensors 928, such as a global positioning system (GPS) sensor, compass, accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The channel estimation field (CEF) device 919 may carry out or perform any of the operations and processes described and shown above. For example, the channel estimation field (CEF) device 919 may be configured to cause to establish, by the device, one or more multiple-input and multiple-output (MIMO) communication channels between the device and a plurality of devices; determine, by the device, a channel estimation field (CEF) for channel estimation in a time domain or frequency domain; and cause to send, by the device, to one or more of the plurality of devices, the CEF. In one embodiment, the multiple-input and multiple-output (MIMO) communication channel includes a single carrier (SC) MIMO channel. In another embodiment, the channel estimation field (CEF) can use Golay complementary sequences. It is understood that the above are only a subset of what the channel estimation field (CEF) device 919 may be configured to perform and that other functions included throughout this disclosure may also be performed by the channel estimation field (CEF) device 919.

While the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), Plain Old Telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments can relate to wireless networks that operate in accordance with one of the IEEE 802.11 standards.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple-Input Multiple-Output (MIMO) transceiver or device, a Single-Input Multiple-Output (SIMO) transceiver or device, a Multiple-Input Single-Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

According to example embodiments of the disclosure, there may be a device. The device can include memory and processing circuitry, configured to: cause to establish, by the device, one or more multiple-input and multiple-output (MIMO) communication channels between the device and a plurality of devices; determine, by the device, a channel estimation field (CEF) for channel estimation of at least one of the one or more MIMO communication channels in a time domain or frequency domain; and cause to send, by the device, to one or more of the plurality of devices, the CEF.

Implementation may include one or more of the following features. The device may include one or more MIMO communication channels which may further include at least one single carrier (SC) MIMO channel. The processor of the device may further be configured to determine the CEF can be based at least in part on a Golay complementary pair sequence set. In one embodiment, the Golay complementary pair sequence set further includes Golay sequences, wherein the Golay sequences have an arbitrary length. The CEF can use a zero cross correlation property of the Golay sequences for channel estimation. The CEF can be based at least in part on a single-input single-output (SISO) CEF. Further one or more sequences associated with the SISO CEF can be determined with a predetermined sign pattern and can be repeated in time. The predetermined sign pattern can be defined based at least in part on an orthogonal matrix. The orthogonal matrix can be a Hadamard matrix. The device can include a transceiver configured to transmit and receive wireless signals and an antenna coupled to the transceiver.

According to example embodiments of the disclosure, there may be a non-transitory computer-readable medium storing computer-executable instructions which, when executed by a processor, cause the processor to perform operations including: establish, by the processor, one or more multiple-input and multiple-output (MIMO) communication channels between a device and a second device; receive, by the processor, a channel estimation field (CEF) for channel estimation of at least one of the one or more MIMO communication channels in a time domain or frequency domain; and determining first information based at least in part on the received CEF; and sending, to the second device, the first information.

Implementation may include one or more of the following features. The one or more MIMO communication channels include at least one single carrier (SC) MIMO channel. The CEF can be based at least in part on a Golay complementary pair sequence set. The Golay complementary pair sequence set further includes Golay sequences, wherein the Golay sequences have an arbitrary length. The CEF uses a zero cross correlation property of the Golay sequences for channel estimation. The CEF can be based at least in part on a single-input single-output (SISO) CEF. One or more sequences associated with the SISO CEF can be determined with a predetermined sign pattern and can be repeated in time.

According to example embodiments of the disclosure, there may be a method including: establishing one or more multiple-input and multiple-output (MIMO) communication channels between a device and a second device; receiving a channel estimation field (CEF) for channel estimation of at least one of the one or more MIMO communication channels in a time domain or frequency domain; determining first information based at least in part on the received CEF; and sending, to the second device, the first information. The one or more MIMO communication channels include at least one single carrier (SC) MIMO channel. The CEF can be based at least in part on a Golay complementary pair sequence set. The Golay complementary pair sequence set further includes Golay sequences, wherein the Golay sequences have an arbitrary length. The CEF uses a zero cross correlation property of the Golay sequences for channel estimation. The CEF can be based at least in part on a single-input single-output (SISO) CEF. One or more sequences associated with the SISO CEF can be determined with a predetermined sign pattern and can be repeated in time.

According to example embodiments of the disclosure, there may be an apparatus including means for performing a method as described herein. According to example embodiments of the disclosure, there may be a system, including at least one memory device having programmed instruction that, in response to execution, cause at least one processor to perform the methods described herein. According to example embodiments of the disclosure, there may be a machine readable medium including code, when executed, to cause a machine to perform the methods described herein.

According to example embodiments of the disclosure, there may be a non-transitory computer-readable medium storing computer-executable instructions which, when executed by a processor, cause the processor to perform operations including: causing to establish, by the device, one or more multiple-input and multiple-output (MIMO) communication channels between the device and a plurality of devices; determining, by the device, a channel estimation field (CEF) for channel estimation of at least one of the one or more MIMO communication channels in a time domain or frequency domain; and causing to send, by the device, to one or more of the plurality of devices, the CEF.

Implementation may include one or more of the following features. The one or more MIMO communication channels include at least one single carrier (SC) MIMO channel. The non-transitory computer-readable medium of claim 28, wherein the determination of the CEF can be based at least in part on a Golay complementary pair sequence set. The Golay complementary pair sequence set further includes Golay sequences, wherein the Golay sequences have an arbitrary length. The CEF uses a zero cross correlation property of the Golay sequences for channel estimation. The CEF can be based at least in part on a single-input single-output (SISO) CEF. One or more sequences associated with the SISO CEF can be determined with a predetermined sign pattern and can be repeated in time. The predetermined sign pattern can be defined based at least in part on an orthogonal matrix. The orthogonal matrix can be a Hadamard matrix.

According to example embodiments of the disclosure, there may be disclosed a method including: causing to establish, by the device, one or more multiple-input and multiple-output (MIMO) communication channels between the device and a plurality of devices; determining, by the device, a channel estimation field (CEF) for channel estimation of at least one of the one or more MIMO communication channels in a time domain or frequency domain; and causing to send, by the device, to one or more of the plurality of devices, the CEF.-

Implementation may include one or more of the following features. The one or more MIMO communication channels includes at least one single carrier (SC) MIMO channel. The determination of the CEF can be based at least in part on a Golay complementary pair sequence set. The Golay complementary pair sequence set further includes Golay sequences, wherein the Golay sequences have an arbitrary length. The CEF uses a zero cross correlation property of the Golay sequences for channel estimation. The CEF can be based at least in part on a single-input single-output (SISO) CEF. One or more sequences associated with the SISO CEF can be determined with a predetermined sign pattern and can be repeated in time. The predetermined sign pattern can be defined based at least in part on an orthogonal matrix. The orthogonal matrix can be a Hadamard matrix.

According to example embodiments of the disclosure, there may be an apparatus. An apparatus an include: means for causing to establish, by the device, one or more multiple-input and multiple-output (MIMO) communication channels between the device and a plurality of devices; means for determining, by the device, a channel estimation field (CEF) for channel estimation of at least one of the one or more MIMO communication channels in a time domain or frequency domain; and means for causing to send, by the device, to one or more of the plurality of devices, the CEF.-

Implementation may include one or more of the following features. The one or more MIMO communication channels includes at least one single carrier (SC) MIMO channel. The determination of the CEF can be based at least in part on a Golay complementary pair sequence set. The Golay complementary pair sequence set further includes Golay sequences, wherein the Golay sequences have an arbitrary length. The CEF uses a zero cross correlation property of the Golay sequences for channel estimation. The CEF can be based at least in part on a single-input single-output (SISO) CEF. One or more sequences associated with the SISO CEF can be determined with a predetermined sign pattern and can be repeated in time. The predetermined sign pattern can be defined based at least in part on an orthogonal matrix. The orthogonal matrix can be a Hadamard matrix.

According to example embodiments of the disclosure, there may be a device, including: at least one memory that stores computer-executable instructions; and at least one processor of the one or more processors configured to access the at least one memory, wherein the at least one processor of the one or more processors can be configured to execute the computer-executable instructions to: establish one or more multiple-input and multiple-output (MIMO) communication channels between a device and a second device; receive a channel estimation field (CEF) for channel estimation of at least one of the one or more MIMO communication channels in a time domain or frequency domain; determine first information based at least in part on the received CEF; and send, to the second device, the first information. In one embodiment, the one or more MIMO communication channels include at least one single carrier (SC) MIMO channel.

Implementation may include one or more of the following features. The CEF can be based at least in part on a Golay complementary pair sequence set. The Golay complementary pair sequence set further includes Golay sequences, wherein the Golay sequences have an arbitrary length. The CEF uses a zero cross correlation property of the Golay sequences for channel estimation. The CEF can be based at least in part on a single-input single-output (SISO) CEF. One or more sequences associated with the SISO CEF can be determined with a predetermined sign pattern and can be repeated in time.

According to example embodiments of the disclosure, there may be an apparatus including: means for establishing one or more multiple-input and multiple-output (MIMO) communication channels between a device and a second device; means for receiving a channel estimation field (CEF) for channel estimation of at least one of the one or more MIMO communication channels in a time domain or frequency domain; means for determining first information based at least in part on the received CEF; and means for sending, to the second device, the first information.

Implementation may include one or more of the following features. The one or more MIMO communication channels include at least one single carrier (SC) MIMO channel. The CEF can be based at least in part on a Golay complementary pair sequence set. The Golay complementary pair sequence set further includes Golay sequences, wherein the Golay sequences have an arbitrary length. The CEF uses a zero cross correlation property of the Golay sequences for channel estimation. The CEF can be based at least in part on a single-input single-output (SISO) CEF. One or more sequences associated with the SISO CEF can be determined with a predetermined sign pattern and can be repeated in time.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising: memory and processing circuitry, configured to:
   determine, by the device, a multiple-input and multiple-output (MIMO) frame for one or more MIMO communication channels between the device and a plurality of devices, the MIMO frame comprising one or more fields associated with channel estimation;

determine, by the device, a first channel estimation field (CEF) for channel estimation associated with a number of one or more streams;

determine, by the device, a second CEF associated with the first stream;

multiply the first CEF with a first entry in a first row of a mapping matrix;

associate each row of the mapping matrix with two streams of the one or more streams;

multiply the second CEF with a second entry in the first row of the mapping matrix, wherein the first CEF and the second CEF are equal to each other and a duration of the first CEF and the second CEF is one time slot when the number of the one or more streams is less than or equal to 2, and wherein the first CEF and the second CEF are inverse of each other and the duration of the first CEF and the second CEF is two timeslots when the number of the one or more streams is greater than 2 and less than or equal to 4; and cause to send, by the device, to one or more of the plurality of devices, the MIMO frame comprising the first CEF and the second CEF.

2. The device of claim 1, wherein the one or more MIMO communication channels comprises at least one single carrier (SC) MIMO channel.

3. The device of claim 1, wherein the determination of the first CEF is based at least in part on a Golay complementary pair sequence set.

4. The device of claim 3, wherein the Golay complementary pair sequence set further comprises Golay sequences, wherein the Golay sequences have an arbitrary length.

5. The device of claim 4, wherein the first CEF uses a zero cross correlation property of the Golay sequences for channel estimation.

6. The device of claim 1, wherein the first CEF is based at least in part on a single-input single-output (SISO) CEF.

7. The device of claim 6, wherein one or more sequences associated with the SISO CEF are determined with a predetermined sign pattern and are repeated in time.

8. The device of claim 7, wherein the predetermined sign pattern is defined based at least in part on an orthogonal matrix.

9. The device of claim 8, wherein the orthogonal matrix is a Hadamard matrix.

10. A non-transitory computer-readable medium storing computer-executable instructions which, when executed by a processor, cause the processor to perform operations comprising:

establish, by the processor, one or more multiple-input and multiple-output (MIMO) communication channels between a device and a second device;

receive, by the processor, a first channel estimation field (CEF) for channel estimation associated with a a number of one or more streams;

receive, by the processor, a second CEF, wherein the first CEF is multiplied with a first entry in a first row of a mapping matrix, wherein each row of the mapping matrix with two streams of the one or more streams;

determine that the second CEF is multiplied with a second entry in the first row of the mapping matrix, wherein the first CEF and the second CEF are equal to each other and a duration of the first CEF and the second CEF is one time slot when the number of the one or more streams is less than or equal to 2, and wherein the first CEF and the second CEF are inverse of each other and the duration of the first CEF and the second CEF is two timeslots when the number of the one or more streams is greater than 2 and less than or equal to 4; and send, by the processor, to the second device, first information based at least in part on the first CEF and the second CEF.

11. The non-transitory computer-readable medium of claim 10, wherein the one or more MIMO communication channels comprise at least one single carrier (SC) MIMO channel.

12. The non-transitory computer-readable medium of claim 10, wherein the first CEF is based at least in part on a Golay complementary pair sequence set.

13. The non-transitory computer-readable medium of claim 12, wherein the Golay complementary pair sequence set further comprises Golay sequences, wherein the Golay sequences have an arbitrary length.

14. The non-transitory computer-readable medium of claim 13, wherein the first CEF uses a zero cross correlation property of the Golay sequences for channel estimation.

15. The non-transitory computer-readable medium of claim 10, wherein the first CEF is based at least in part on a single-input single-output (SISO) CEF.

16. The non-transitory computer-readable medium of claim 15, wherein one or more sequences associated with the SISO CEF are determined with a predetermined sign pattern and are repeated in time.

17. A method comprising:

determining, by one or more processors, a multiple-input and multiple-output (MIMO) frame for one or more MIMO communication channels between a device and a second device, the MIMO frame comprising one or more fields associated with channel estimation;

determining a first channel estimation field (CEF) for channel estimation associated with a number of one or more streams;

determining a second CEF associated with the first stream;

multiplying the first CEF with a first entry in a first row of a mapping matrix;

associating each row of the mapping matrix with two streams of the one or more streams;

multiplying the second CEF with a second entry in the first row of the mapping matrix, wherein the first CEF and the second CEF are equal to each other and a duration of the first CEF and the second CEF is one time slot when the number of the one or more streams is less than or equal to 2, and wherein the first CEF and the second CEF are inverse of each other and the duration of the first CEF and the second CEF is two timeslots when the number of the one or more streams is greater than 2 and less than or equal to 4; and sending, to the second device, the first information.

18. The method of claim 17, wherein the determined CEF is based at least in part on a single-input single-output (SISO) CEF.

19. The method of claim 17, wherein the MIMO communication channel comprises a single carrier (SC) MIMO channel.

* * * * *